(12) United States Patent
Spicer et al.

(10) Patent No.: US 11,007,713 B2
(45) Date of Patent: May 18, 2021

(54) HIGH THROUGHPUT ADDITIVE MANUFACTURING SYSTEM

(71) Applicant: GM GLOBAL TECHNOLOGY OPERATIONS LLC, Detroit, MI (US)

(72) Inventors: John P Spicer, Plymouth, MI (US); Jason J Nolte, Wixon, MI (US); Thomas A. Perry, Bruce Township, MI (US); Blair E Carlson, Ann Arbor, MI (US); Anil K Sachdev, Rochester Hills, MI (US); Hyungmin Chae, Novi, MI (US); Mark A Smith, Huntington Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 15/497,832

(22) Filed: Apr. 26, 2017

(65) Prior Publication Data
US 2018/0311731 A1 Nov. 1, 2018

(51) Int. Cl.
*B29C 64/20* (2017.01)
*B33Y 30/00* (2015.01)
(Continued)

(52) U.S. Cl.
CPC .............. *B29C 64/20* (2017.08); *B22F 12/00* (2021.01); *B29C 64/153* (2017.08);
(Continued)

(58) Field of Classification Search
CPC ...................... B22F 3/1055; B22F 2003/1056; B22F 12/00; B29C 64/20; B29C 64/153; B29K 2105/251; B33Y 30/00; B33Y 40/00
See application file for complete search history.

(56) References Cited

U.S. PATENT DOCUMENTS 5,639,070 A * 6/1997 Deckard ................ B33Y 10/00
264/497
7,141,207 B2 11/2006 Jandeska, Jr. et al.
(Continued)

FOREIGN PATENT DOCUMENTS

GB 2543305 A * 4/2017 ............ B22F 3/1055
WO 2016/142930 A1 9/2016

OTHER PUBLICATIONS

Wikipedia, "Laser scanning", 2016, https://en.wikipedia.org/wiki/Laser_scanning (Year: 2016).*
(Continued)

*Primary Examiner* — Joseph S Del Sole
*Assistant Examiner* — Jerzi H Moreno Hernandez
(74) *Attorney, Agent, or Firm* — Cantor Colburn LLP

(57) ABSTRACT

An additive manufacturing system includes a powder delivery system, an area scanning laser, a build chamber, and a controller. The powder delivery system provides a predetermined amount of powder material to the build chamber, and includes a material dispenser, a dispensing head, and a scraper. The scanning laser selectively sinters the powder material, and includes a mirror galvanometer for raster scanning. The build chamber has an annular configuration, and includes an inner annular wall that defines a central portion disposed inward of the build chamber. A portion of the delivery system and the laser are located in the central portion. The chamber continuously rotates under the head and under a sintering zone generated by the laser as the delivery system continuously dispenses the material. The laser continuously raster scans the material at the sintering zone in a raster pattern to sinter a layer of material directly to a preceding layer.

10 Claims, 5 Drawing Sheets

(51) Int. Cl.
*B33Y 40/00* (2020.01)
*B29C 64/153* (2017.01)
*B22F 12/00* (2021.01)
*B29C 64/241* (2017.01)
*B29C 64/171* (2017.01)
*B29K 105/00* (2006.01)

(52) U.S. Cl.
CPC .......... *B29C 64/171* (2017.08); *B29C 64/241* (2017.08); *B33Y 30/00* (2014.12); *B33Y 40/00* (2014.12); *B29K 2105/251* (2013.01)

(56) References Cited

U.S. PATENT DOCUMENTS

| | | | | |
|---|---|---|---|---|
| 2003/0028278 | A1* | 2/2003 | Darrah | G05B 19/4099 |
| | | | | 700/119 |
| 2003/0205851 | A1* | 11/2003 | Laschutza | B22F 3/1055 |
| | | | | 264/496 |
| 2004/0265413 | A1* | 12/2004 | Russell | B41J 2/16532 |
| | | | | 425/375 |
| 2006/0108712 | A1* | 5/2006 | Mattes | B22F 3/004 |
| | | | | 264/308 |
| 2007/0029698 | A1 | 2/2007 | Rynerson et al. | |
| 2007/0063372 | A1* | 3/2007 | Nielsen | B29C 64/165 |
| | | | | 264/113 |
| 2008/0109102 | A1* | 5/2008 | Sutcliffe | B29C 64/165 |
| | | | | 700/119 |
| 2012/0211155 | A1* | 8/2012 | Wehning | A61C 13/0013 |
| | | | | 156/275.5 |
| 2013/0264750 | A1* | 10/2013 | Hofacker | B22F 3/1055 |
| | | | | 264/497 |
| 2014/0191439 | A1* | 7/2014 | Davis | B29C 41/22 |
| | | | | 264/259 |
| 2015/0057784 | A1 | 2/2015 | Butler et al. | |
| 2015/0061190 | A1 | 3/2015 | Yakubov et al. | |
| 2015/0328838 | A1 | 11/2015 | Erb et al. | |
| 2016/0193695 | A1* | 7/2016 | Haynes | B23K 26/0604 |
| | | | | 219/76.12 |
| 2016/0368050 | A1* | 12/2016 | Morris | B33Y 10/00 |
| 2017/0050386 | A1* | 2/2017 | Houben | B29C 64/357 |
| 2017/0120537 | A1* | 5/2017 | DeMuth | B22F 3/1055 |
| 2017/0190112 | A1* | 7/2017 | Thorson | B33Y 30/00 |
| 2017/0341180 | A1* | 11/2017 | Zediker | B22F 3/1055 |
| 2018/0085856 | A1* | 3/2018 | Bour | B33Y 30/00 |
| 2018/0111322 | A1* | 4/2018 | Mathea | B33Y 50/02 |
| 2018/0200835 | A1* | 7/2018 | Chae | B33Y 10/00 |

OTHER PUBLICATIONS

Wikipedia, "Mirror galvanometer", 2016, https://en.wikipedia.org/wiki/Mirror_galvanometer (Year: 2016).*

* cited by examiner

HIGH THROUGHPUT ADDITIVE MANUFACTURING SYSTEM

FIELD

The present disclosure relates to additive manufacturing, and more particularly to a high throughput system for use in an additive manufacturing process.

INTRODUCTION

The statements in this section merely provide background information related to the present disclosure and may not constitute prior art.

Additive manufacturing, also known as 3-D printing, refers to a process for creating a three-dimensional object through automated control by sequential layer material addition/joining within a three-dimensional work envelope. Objects can be manufactured in various shapes and geometries and can include sacrificial or support materials, enabling design shapes that were previously unachievable. Various additive manufacturing processes are known, differing primarily in the way that material layers are deposited and in materials used. In particular, additive manufacturing processes can include, for example, fused deposition modeling, laser sintering, electron beam melting, and inkjet 3D printing, using materials such as thermoplastic filaments, metal powders, plaster, or resins.

Selective laser sintering (SLS) involves the use of a high-powered laser for fusing small particles of plastic, metal, ceramic, or glass powder into a desired three-dimensional shape. In further detail, in an SLS machine, a deposition device delivers a fine layer of powder to a build area. Next, a laser raster-scans over the layer of material at locations corresponding to a cross-section of a generated file (e.g., CAD or scan data), in order to selectively fuse the powdered material on the surface of the powder bed within the build area. After the cross-section is scanned or selectively sintered, the powder bed is lowered by one layer of thickness and a new layer of material is deposited over the build area. The process is then repeated until a final part is achieved. As should be understood, this is a time intensive process that is impacted heavily by the size and complexity of the part to be generated.

SUMMARY

In a first arrangement, an additive manufacturing system has a powder delivery system for presenting a powder material to a build chamber. A laser selectively sinters the powder material in the build chamber. The build chamber is presented in an annular configuration with the powder delivery system and laser arranged within a central portion thereof.

Furthermore, the annular build chamber rotates under the powder delivery system and the laser. The powder delivery system also includes a material dispenser for dispensing the powder material and a scraper for removing excess material from the build chamber. Additionally, the build chamber has a fixed height and the powder delivery system and laser are vertically movable. Alternately, the powder delivery system and laser have a fixed height and the build chamber is vertically movable. The laser may also move in a raster pattern to sinter a layer of powder material to a directly preceding layer of powder material and the layer of powder material may be a different composition than the directly preceding layer of powder material. Furthermore, at least one of the build chamber, the laser, the material dispenser, and the scraper is independently movable. The build chamber may also be divided into a plurality of independently movable sections and the selective sintering of the laser produces at least one workpiece in at least one of the plurality of sections of the build chamber with each workpiece having an alternate configuration.

In another arrangement, an additive manufacturing system has a powder delivery system for providing a predetermined amount of a powder material to an annular build chamber. A laser selectively sinters the powder material in the build chamber. The powder delivery system and the laser are arranged within a central portion of the annular build chamber. At least one of the annular build chamber and the laser are vertically movable with respect to the other of the annular build chamber and the laser.

Furthermore, the annular build chamber is rotatable under the powder delivery system and the laser. The powder delivery system also includes a material dispenser for dispensing the powder material and a scraper for removing excess material from the build chamber. Additionally, the laser may move in a raster pattern to sinter a layer of powder material to a directly preceding layer of powder material and the layer of powder material may be a different composition than the directly preceding layer of powder material. The annular build chamber may also be divided into a plurality of independently movable sections and the selective sintering of the laser produces at least one workpiece in at least one of the plurality of sections of the annular build chamber with each workpiece having an alternate configuration.

In yet another arrangement, an additive manufacturing system has a powder delivery system for providing a predetermined amount of a powder material to an annular build chamber. A laser selectively sinters the powder material in the build chamber. The powder delivery system and the laser are arranged within a central portion of the annular build chamber. The annular build chamber may be divided into a plurality of independently movable sections.

Furthermore, the selective sintering of the laser produces at least one workpiece in at least one of the plurality of sections of the annular build chamber.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
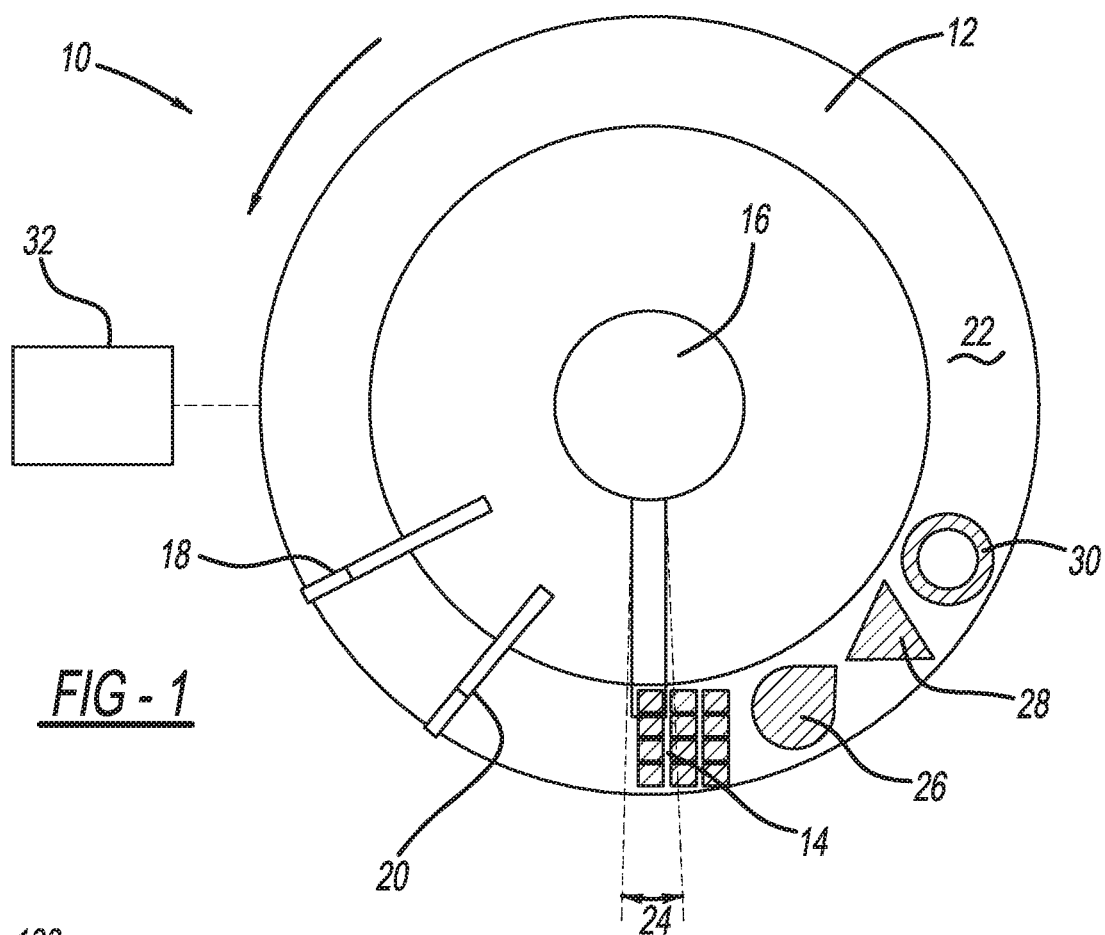
FIG. 1 is a schematic top view of a rotatable build chamber according to the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. Furthermore, it should be understood that throughout the drawings, corresponding reference numerals indicate like or corresponding parts and features. Further, directions such as "top," "side," and "back" are used for purposes of explanation and are not intended to require specific orientations unless otherwise stated.

Referring now to FIG. 1, an exemplary high throughput additive manufacturing system 10 is shown having an annular, rotating powder bed build chamber 12. The additive manufacturing system 10 is capable of producing workpieces 14 at high volumes by enabling continuous operation of a high powered laser area scanning system, as will be described in greater detail below with respect to the various embodiments. In particular, the additive manufacturing system 10 includes the annular, rotating powder bed build chamber 12, a high power laser 16 arranged centrally within the build chamber 12, a material dispensing head 18 for depositing layers of powder material within the build chamber 12, and a scraper blade 20 for removing excess material deposited by the material dispensing head 18. The annular, rotating design for the build chamber 12 allows for high throughput capability of the laser system by eliminating any delay due to laser interruption during powder re-coating.

In the exemplary additive manufacturing system 10, the annular build chamber 12 may be provided at a fixed height, may be vertically movable, or may be provided with movable sections, as will be further described below. Similarly, the laser 16, material dispensing head 18, and scraper blade 20 may be vertically movable with respect to the chamber 12 or may be fixed from vertical movement with respect to the chamber 12. In all embodiments, however, the material dispensing head 18 deposits a powder material (e.g., metallic, polymeric, ceramic) onto an upper surface 22 of the build chamber 12 in order to construct a solid three-dimensional (3D) object. As the chamber 12 rotates, the scraper blade 20 removes excess material from the upper surface 22 of the build chamber 12, prior to entering a sintering zone 24 within the build chamber 12. The sintering zone 24 corresponds to an area within the build chamber 12 where a high power area scanning laser and/or single point lasers, collectively laser 16, can raster scan the material layer in order to sinter the material in an arrangement corresponding to an incremental layer of the final workpiece 14.

The material dispensing head 18 typically deposits layer upon layer of material, gradually adding object details for building the 3D object representation (i.e., workpiece 14), while the laser 16 sinters each layer to the previous material layer in order to form the final workpiece 14. Notably, the build chamber 12 is a rotating ring of powder, wherein each full rotation of the build chamber 12 adds another layer of powder (e.g., about 0.025-0.050 mm) to the workpiece 14. As such, rotation of the build chamber 12 will correspond to the number of material layers required for the tallest workpiece 14 provided. It should also be understood that alternate workpiece designs (e.g., workpiece 14, workpiece 26, workpiece 28, workpiece 30) may be manufactured concurrently in the build chamber 12, such that any number of workpieces may be manufactured in a batch process. Furthermore, it should also be understood that the additive manufacturing system 10 may also operate with no workpieces within a particular section of the build chamber 12. In this case, if a section of the build chamber 12 did not have a workpiece, the section would remain at a "full position" and the scraper blade 20 would push excess powder material along to the next section of the build chamber 12 having a workpiece.

In operation, the laser 16 is allowed to continuously raster scan the powder at the sintering zone 24, without interruption, until the workpieces are finalized. A high speed mirror galvanometer may also be used to raster scan the laser area in a local region (e.g., 300 mm$^2$) within the sintering zone 24. Furthermore, while described as a high powered laser area scanning system, the laser 16 may also be a plurality of lasers working in series or in parallel. In one example, an area scanning laser and a point laser may be used to first outline a workpiece and then complete the laser sintering of the interior portions.

The rotational speed of the build chamber 12 may be computer controlled (e.g., via controller 32) in order to correspond with the scanning speed of the laser 16 and, as such, may vary throughout the process depending upon workpiece complexity. Notably, the build chamber 12 may also be sealed (e.g., vacuum or inert gas) to remove any effects from the external environment on the powder materials. Furthermore, while a single material dispensing head 18 and scraper blade 20 are described and shown, it is also contemplated to provide multiple powder delivery stages and/or multiple scraper blades, as needed, to distribute powder evenly at a high speed. Additional scrapers arranged about the build chamber may also be advantageous for collecting spatter or powder nuggets for removal prior to application of the next material layer.

Figure 2:
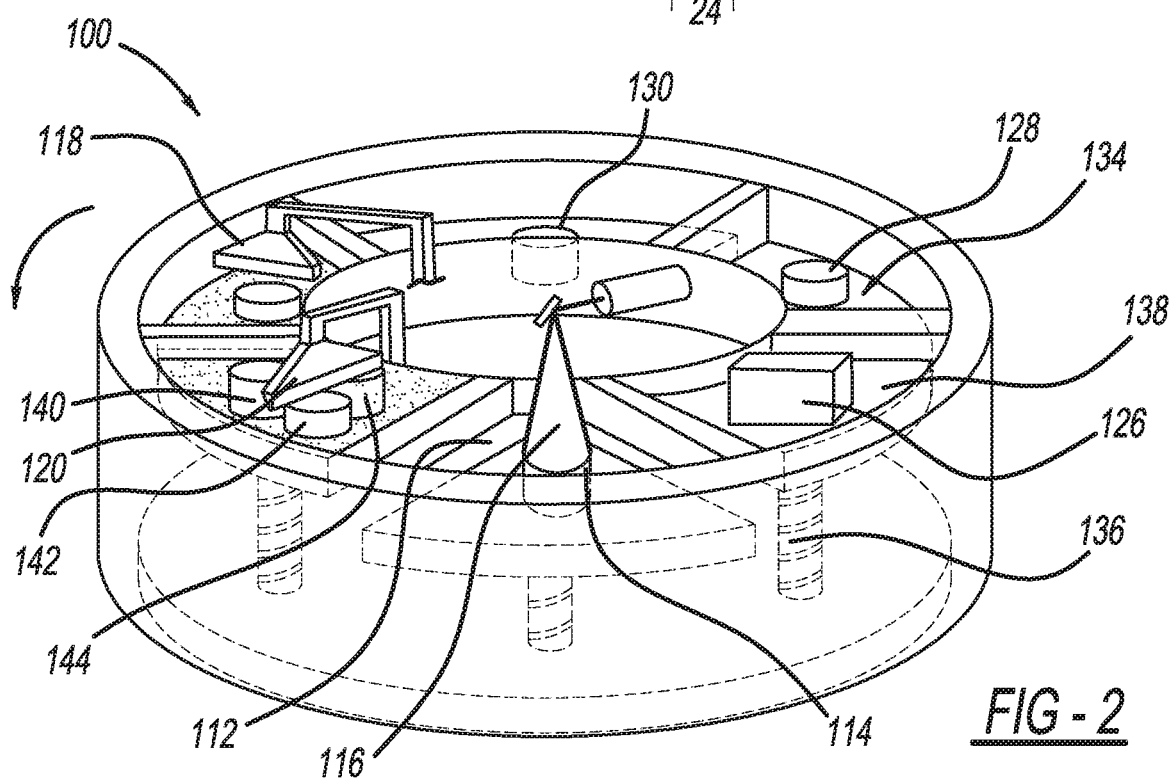
FIG. 2 is a schematic perspective view of a build chamber incorporating a separable elevating system according to the present disclosure.
Figure 3:
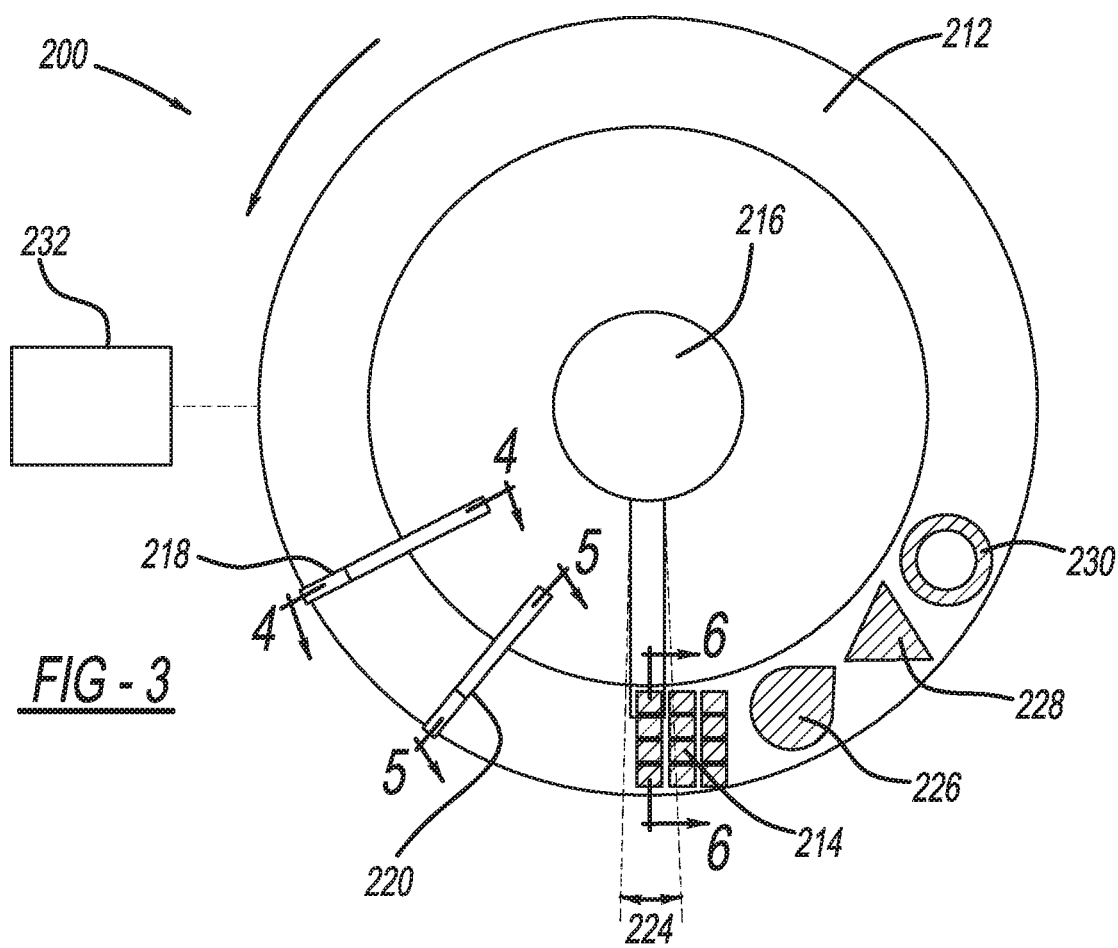
FIG. 3 is a schematic perspective view of a fixed height build chamber according to the present disclosure.
Figure 4:
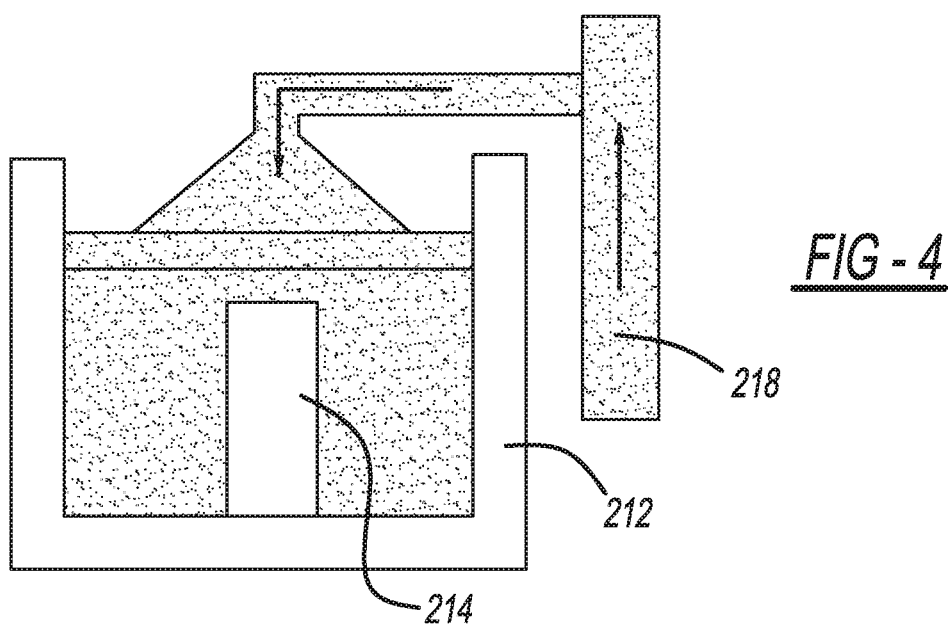
FIG. 4 is a schematic cross-sectional view of the fixed height build chamber of FIG. 3 depicting a vertically movable material dispensing head.
Figure 5:
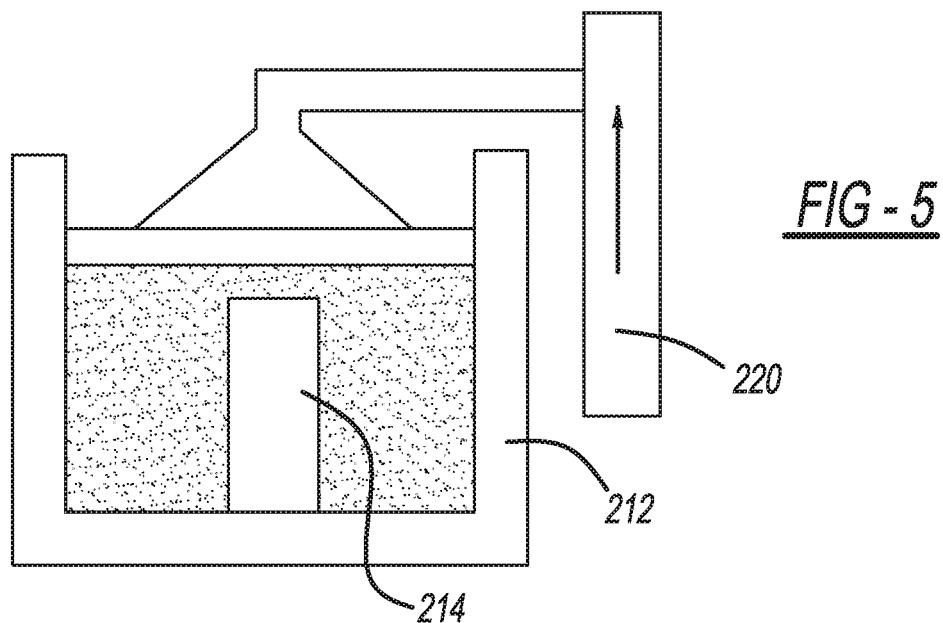
FIG. 5 is a schematic cross-sectional view of the fixed height build chamber of FIG. 3 depicting a vertically movable material scraper.
Figure 6:
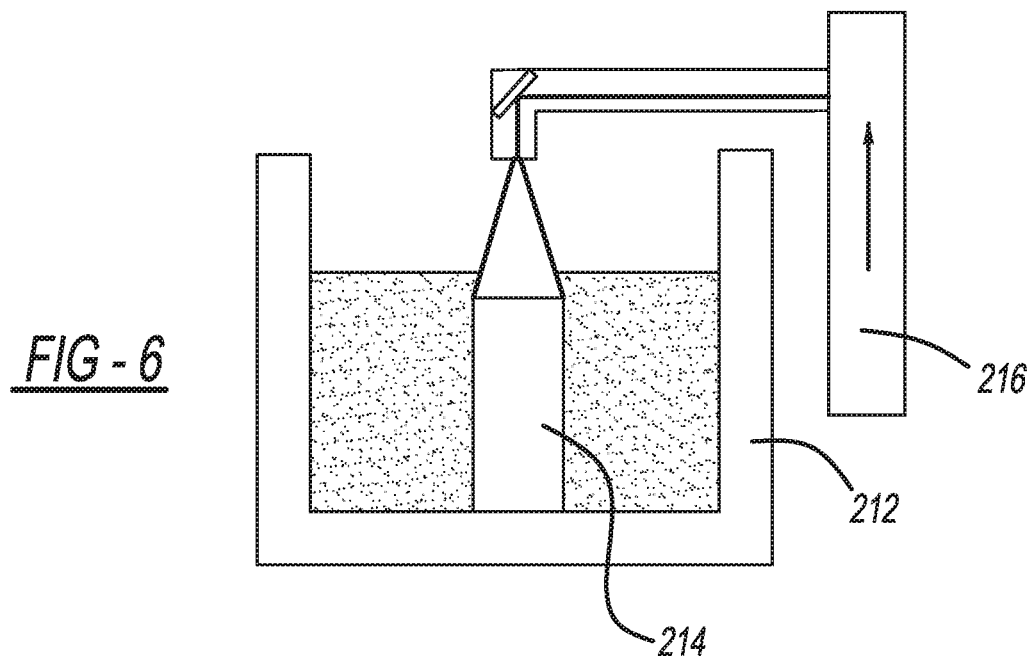
FIG. 6 is a schematic cross-sectional view of the fixed height build chamber of FIG. 3 depicting a vertically movable laser device.
Figure 7:
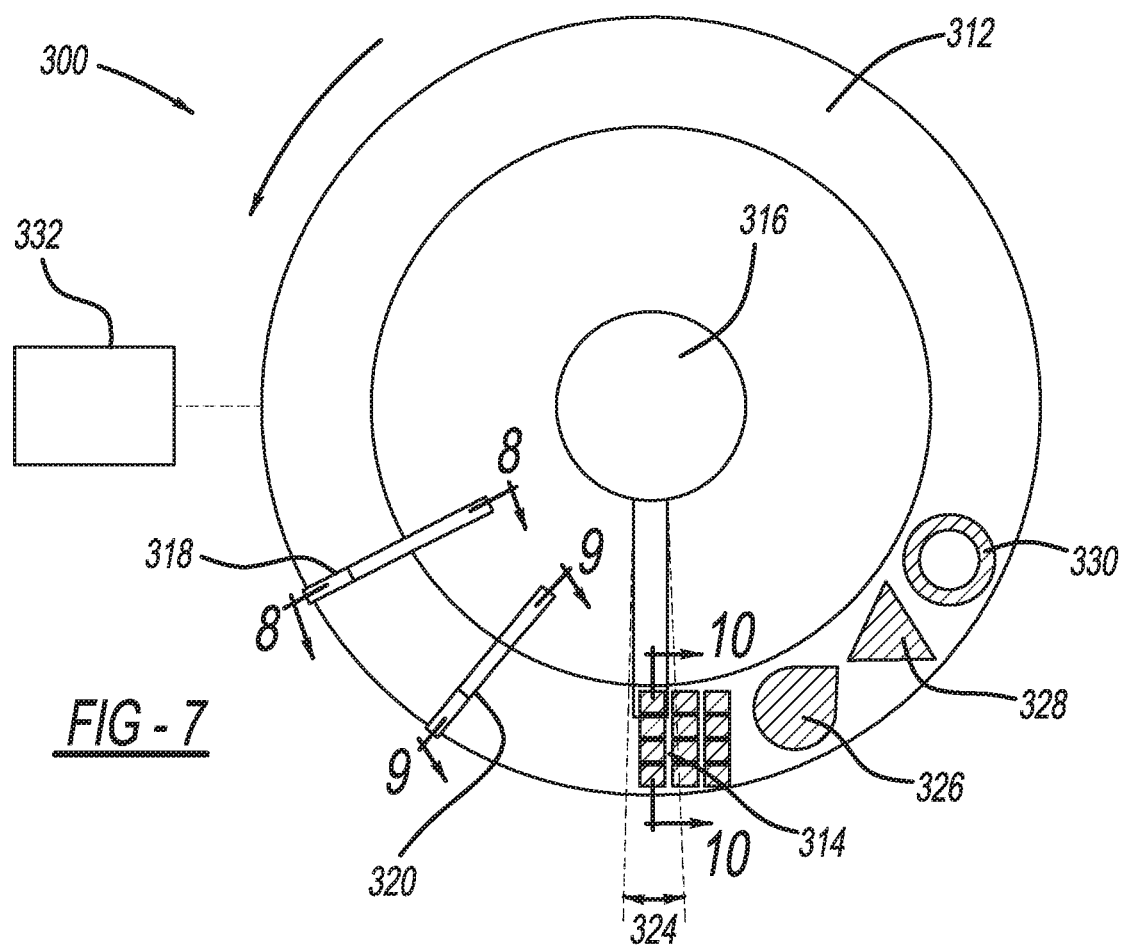
FIG. 7 is a schematic perspective view of a vertically movable build chamber according to the present disclosure.
Figure 8:
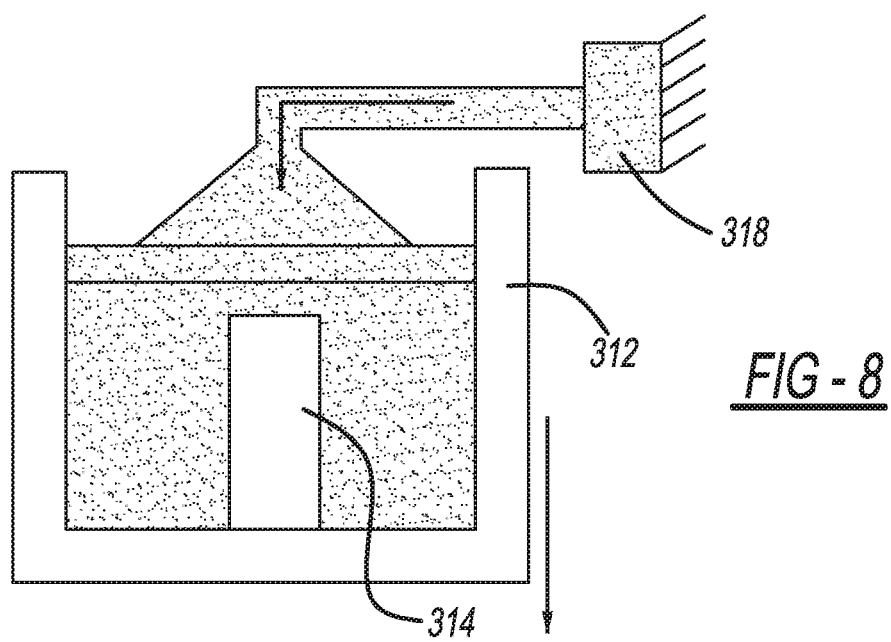
FIG. 8 is a schematic cross-sectional view of the vertically movable build chamber of FIG. 7 depicting a fixed material dispensing head.
Figure 9:
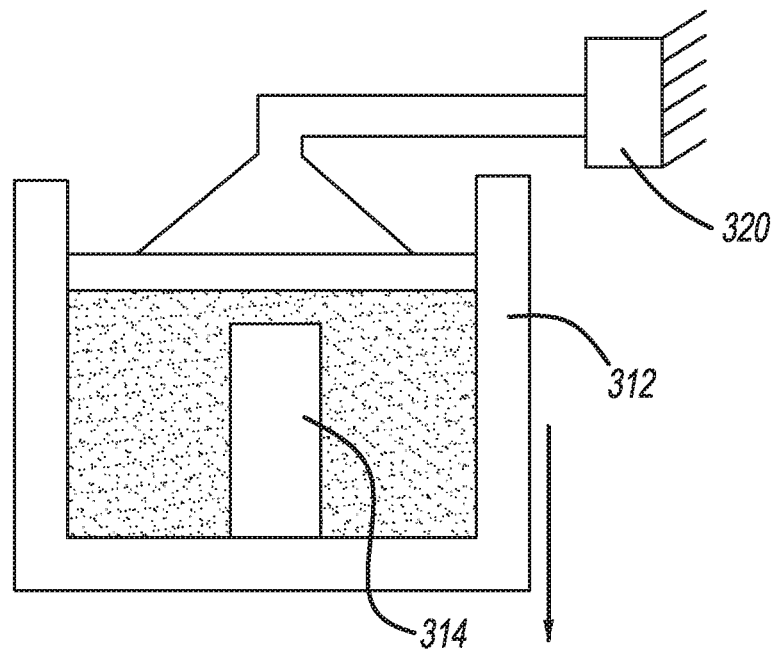
FIG. 9 is a schematic cross-sectional view of the vertically movable build chamber of FIG. 7 depicting a fixed material scraper.
Figure 10:
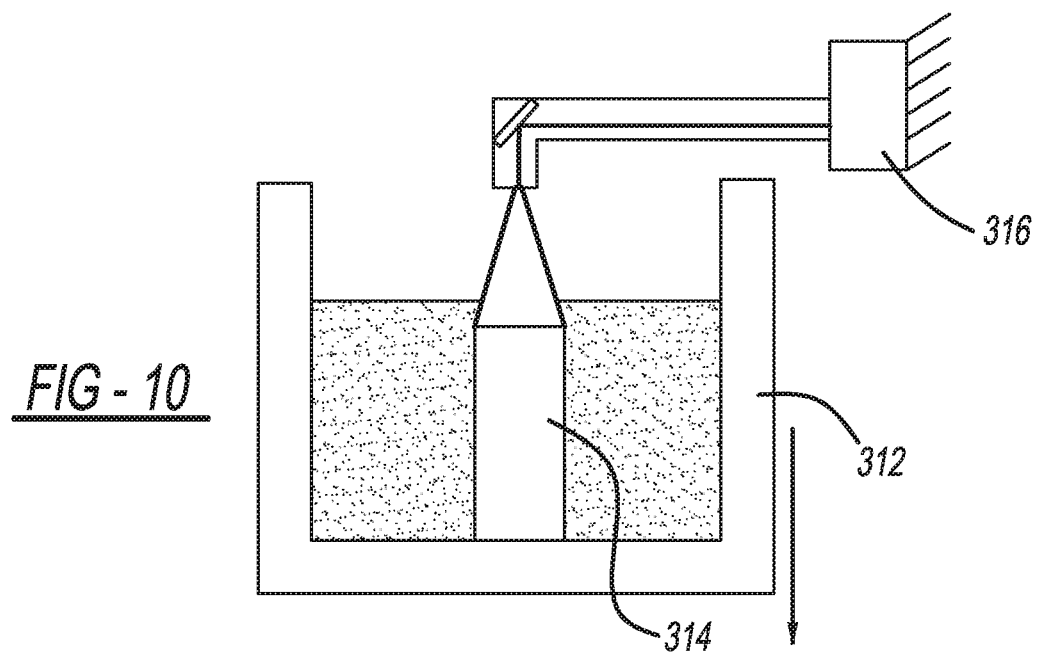
FIG. 10 is a schematic cross-sectional view of the vertically movable build chamber of FIG. 7 depicting a fixed laser device.

With reference now to FIG. 2, an exemplary additive manufacturing system 100 may include a build chamber 112 having a plurality of individually movable, build plate ball screw elevators 134. The additive manufacturing system 100 is similar to the additive manufacturing system 10, and therefore, like features will be described with like reference numbers.

The build plate ball screw elevators 134 may each have an individual ball screw system 136 for lowering or raising a corresponding build plate 138 over a distance equal to the height of the tallest workpiece to be produced in the build chamber 112. In this way, material waste at the top of the chamber can be omitted for shorter workpieces. In other words, individualized movement of each of the build plates 138 permits operation without the necessity for equal filling of the volume of the build chamber 112.

In operation, the additive manufacturing system 100 may be used to manufacture a system of workpieces 114, 126, 128, 130 having various configurations and/or heights. Initially, the individual build plates 138 corresponding to each workpiece 114, 126, 128, 130 may be moved to a position corresponding to the vertical height of the tallest workpiece (e.g., workpiece 114) through movement of the ball screw system 136. Upon rotation of the build chamber 112, a material dispensing head 118 dispenses a powder material onto the build plates 138. A scraper blade 120 removes excess material from the build plate 138 as the build plate 138 rotates in order to scrape material to the correct height, prior to the build plate 138 entering a sintering zone. As the build plate 138 rotates into the sintering zone, a laser 116 raster scans a single layer of a workpiece 114, 126, 128, or 130. During each rotation of the build chamber 112, the ball screw system 136 gradually moves each of the build plates 138 downwardly for receipt of the next layer of powder material expended from the material dispensing head 118. Downward movement ceases for each workpiece after the individual workpiece is completed, while taller workpieces continue to build, thereby preventing waste of powder on top of finished workpieces.

While the build plate ball screw elevators 134 have been described as having an individual build plate 138 corresponding to each workpiece 114, 126, 128, 130, it should be understood that multiple workpieces 140, 142, 144 could also be manufactured on a single build plate 138. Furthermore, build plates 138 can be exchanged during use to provide ease in workpiece management. In this way, the build plates 138 can serve as workpiece holding pallets, which may be removed from the additive manufacturing system 100 after building and conveniently moved to another step in the manufacturing process (e.g., heat treatment, machining).

Build plate exchange also provides the ability to manufacture additional workpieces sequentially during the pendency of a tall workpiece build (e.g., height of first workpiece is greater than additive height of second and third workpieces). In this way, cycle time for the system can be effectively reduced. It should also be understood that while the individual build plates 138 are described as being raised/lowered by a ball screw configuration, other raising/lowering devices may be used (e.g., pistons).

With reference now to FIG. 3 through FIG. 6, an alternate additive manufacturing system 200 may be used to manufacture workpieces 214, 226, 228, 230 having various configurations and/or heights. The additive manufacturing system 200 is similar to the additive manufacturing system 10, and therefore, like features will be described with like reference numbers. The additive manufacturing system 200 includes a fixed height, annular, rotating powder bed build chamber 212, a vertically movable high power laser 216 arranged centrally within the build chamber 212, a vertically movable material dispensing head 218 for depositing layers of powder material within the build chamber 212, and a vertically movable scraper blade 220 for removing excess material deposited by the material dispensing head 218. As noted above, the annular build chamber 212 has a fixed height, while the powder delivery system (i.e., material dispensing head 218, scraper blade 220) and laser 216 incrementally raise in height (one layer per revolution) as the process proceeds.

As previously noted, the laser 216 continuously raster scans the powder at the sintering zone 224, without interruption, until the workpieces are finalized. The rotational speed of the build chamber 212 and/or the height adjustment of the laser 216, material dispensing head 218, and scraper blade 220 may be computer controlled (e.g., via controller 232) in order to correspond with the scanning speed of the laser 216 and, as such, may vary throughout the process depending upon workpiece complexity. The material dispensing head 218 continuously dispenses a powder material into the build chamber 212 upon rotation thereof (see FIG. 4). The scraper blade 220 removes excess material as the build chamber 212 rotates in order to provide material at the correct height, prior to the material entering the sintering zone 224 (see FIG. 5). After rotation into the sintering zone 224, the laser 216 raster scans a single layer of a workpiece 214, 226, 228, or 230 (see FIG. 6). During each rotation of the build chamber 212, the controller 232 gradually moves each of the laser 216, material dispensing head 218, and scraper blade 220 upwardly for manipulating the next layer of powder material expended from the material dispensing head 218.

In an alternate configuration, the rotational and linear motions of the additive manufacturing system may be separated by coordinating programmable linear actuators. In this way, the powder delivery system (i.e., material dispensing head 218, scraper blade 220) and laser 216 can be incrementally raised for each layer. The rotational motion of the build chamber 212 could be managed by a separate programmable rotational axis.

In another embodiment shown in FIG. 7 through FIG. 10, an alternate additive manufacturing system 300 may be used to manufacture workpieces 314, 326, 328, 330 having various configurations and/or heights. The additive manufacturing system 300 is similar to the additive manufacturing system 10, and therefore, like features will be described with like reference numbers. The additive manufacturing system 300 includes a vertically movable, annular, rotating powder bed build chamber 312, a fixed high power laser 316 arranged centrally within the build chamber 312, a fixed material dispensing head 318 for depositing layers of powder material within the build chamber 312, and a fixed scraper blade 320 for removing excess material deposited by the material dispensing head 318. As noted above, the annular build chamber 312 may incrementally lower in height (one layer per bed revolution), while the powder delivery system (i.e., material dispensing head 318, scraper blade 320) and laser 316 are fixed as the process proceeds.

As previously discussed, the laser 316 may continuously raster scan the powder at the sintering zone 324, without interruption, until the workpieces 314, 326, 328, or 330 are finalized. The rotational speed and/or the height adjustment of the build chamber 312 may be computer controlled (e.g., via controller 332) in order to correspond with the scanning speed of the laser 316 and, as such, may vary throughout the process depending upon workpiece complexity. The material dispensing head 318 continuously dispenses a powder material into the build chamber 312 upon rotation thereof (see FIG. 8). The scraper blade 320 removes excess material as the build chamber 312 rotates in order to provide material at the correct height, prior to the material entering the sintering zone 324 (see FIG. 9). After rotation into the sintering zone 324, the laser 316 raster scans a single layer of the workpieces 314, 326, 328, 330 (see FIG. 10). During each rotation of the build chamber 312, the controller 332 gradually moves the build chamber 312 downwardly for manipulating the next layer of powder material expended from the material dispensing head 318.

With each of the aforementioned rotating build chambers 12, 112, 212, 312, a centrifugal force may be created due to the rotational speeds of the build chamber, which may, in turn, improve packing forces and packing density of the powder. However, inclining the upper surface of the build chamber may be necessary to offset the centrifugal forces and balance gravity to prevent powder shifting. While all embodiments above describe a rotating build chamber with a stationary (albeit movable in a vertical plane) powder delivery and laser system, it is also contemplated that the build chamber could remain stationary with a rotatable powder delivery and laser system. Similarly, both the build chamber and the powder delivery/laser system may be movable at differing opposing rates in order to optimize the process.

The workpieces manufactured in the exemplary embodiments can be formed with a single material during the additive manufacturing process or can be designed as a graded material structure with different material(s) presented at the various layers. Furthermore, the embodiments provided describe all rotational motion as occurring at the build chamber; however, a stationary build chamber and rotationally movable laser, material dispensing head, and scraper blade is also contemplated. Additionally, the build chamber, laser, material dispensing head, and/or scraper blade can each rotate or move independently in the same or in opposite directions.

The build chambers may also revolve on an inclined plane (e.g., through a large screw and nut system) in order to create the simultaneous circular motion of the machine with a small linear step height each layer. As such, it should be clear that this description is merely exemplary in nature and, thus, variations that do not depart from the gist of the disclosure are intended to be within the scope of the disclosure. Such variations are not to be regarded as a departure from the spirit and scope of the disclosure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An additive manufacturing system, comprising:
a powder delivery system for providing a predetermined amount of a powder material to a build chamber, the powder delivery system including a dispensing head for dispensing the powder material and a scraper for removing excess powder material from the build chamber;
an area scanning laser for selectively sintering the powder material in the build chamber at a sintering zone, the area scanning laser including a mirror galvanometer;
the build chamber having an annular configuration, the annular configuration creating a circular space being a central portion enclosed by an inner annular wall of the build chamber such that the central portion is located radially inward of the build chamber, wherein the build chamber is divided into a plurality of sections, wherein each one of the plurality of sections span circumferentially to adjacent sections of the plurality of sections, wherein each of the plurality of sections further includes a build plate onto which the powder material is dispensed, wherein the powder delivery system and the area scanning laser are supported and extend from the central portion of the build chamber, wherein the build chamber is configured rotate under the powder delivery system and under the area scanning laser; and
a controller configured to:
control the build chamber to continuously rotate;
control the powder delivery system to continuously dispense the powder material;
control the area scanning laser to continuously raster scan the powder material at the sintering zone;
control relative positioning between the build chamber, the area scanning laser, the dispensing head and the scraper such that a plurality of workpieces are built in the plurality of sections, the plurality of workpieces including a tallest workpiece being built in at least one of the plurality of sections; and
control the area scanning laser to sinter a single layer of powder material of each workpiece at the sintering zone, and
wherein each of the build plates is independently removable and exchangeable from the build chamber whereby when one of the plurality of workpieces which is shorter is completed prior to the tallest workpiece, the completed shorter workpiece and its build plate are configured to be removed from the build chamber and exchanged such that the powder material is dispensed to build another workpiece while the tallest workpiece is being completed.

2. The additive manufacturing system of claim 1, wherein the dispensing head includes the scraper thereon.

3. The additive manufacturing system of claim 2, wherein the build chamber has a fixed height and the powder delivery system and area scanning laser are vertically movable.

4. The additive manufacturing system of claim 2, wherein the powder delivery system and area scanning laser have a fixed height and the build chamber is vertically movable.

5. The additive manufacturing system of claim 2, wherein the dispensing head is configured to dispense powder material of different composition.

6. The additive manufacturing system of claim 2, wherein at least one of the build chamber, the area scanning laser, the material dispenser, and the scraper is independently movable.

7. The additive manufacturing system of claim 2, wherein the dispensing head is configured to continuously dispense powder material and the area scanning laser is configured to continuously raster scan the powder material at the sintering zone until the tallest workpiece of the plurality of workpieces in the build chamber is completed.

8. The additive manufacturing system of claim 7, wherein each of the plurality of sections of the build chamber is independently movable.

9. An additive manufacturing system, comprising:
a powder delivery system for continuously providing a predetermined amount of a powder material to an annular build chamber to build a plurality of workpieces in a batch;
the annular build chamber including a plurality of sections, each section having an independently moveable build plate for building at least one of the plurality of workpieces thereon, each section spanning circumferentially to adjacent sections of the plurality of sections, the annular build chamber defining a central portion encircled by an inner annular wall of the annular build chamber such that the central portion is positioned radially inward of the annular build chamber;
an area scanning laser for continuously sintering the powder material in the annular build chamber at a sintering zone, wherein a portion of the powder delivery system and the area scanning laser are arranged within the central portion of the annular build chamber;
a controller configured to:
continuously rotate the annular build chamber around the central portion;
control the powder delivery system to continuously deliver the powder material;
control the area scanning laser to continuously raster scan the powder material at the sintering zone; and
control relative positioning between the annular build chamber, the area scanning laser, the powder delivery system such that the plurality of workpieces are built in the plurality of sections, the plurality of workpieces including a tallest workpiece being built in at least one of the plurality of sections, wherein the area scanning laser continuously sinters and the powder delivery system continuously delivers powder material until all layers of the tallest workpiece of the batch are complete; and
wherein the build plates are removably attached to the sections of the annular build chamber whereby when one of the plurality of workpieces is completed prior to the tallest workpiece, the completed workpiece and its build plate are configured to be removed and replaced with another build plate such that the powder material is dispensed to build on the replacement build plate having one of the plurality of workpieces to build being shorter than a portion of the tallest workpiece left to build in the batch.

10. The additive manufacturing system of claim 9, wherein at least one of the sections of the annular build chamber is a free section that has the workpiece removed and wherein the free section is completely filled with powder material such that additional powder material cannot be dispensed in the free section while the batch is being completed.

* * * * *